US012636861B2

(12) United States Patent
Clement et al.

(10) Patent No.: US 12,636,861 B2
(45) Date of Patent: May 26, 2026

(54) MODIFIED MELAMINE-FORMALDEHYDE RESIN, A PAPER IMPREGNATED WITH A MODIFIED MELAMINE-FORMALDEHYDE RESIN, A METHOD FOR MANUFACTURING A FLOOR PANEL, AND USE OF DICYANDIAMIDE AS A MODIFIER IN A MELAMINE-FORMALDEHYDE RESIN

(71) Applicant: FLOORING INDUSTRIES LIMITED, SARL, Bertrange (LU)

(72) Inventors: Benjamin Clement, Waregem (BE); José Meirlaen, Deinze (BE); Jurgen De Couvreur, Wielsbeke (BE)

(73) Assignee: UNILIN BV, Wielsbeke (BE)

( * ) Notice: Subject to any disclaimer, the term of this patent is extended or adjusted under 35 U.S.C. 154(b) by 253 days.

(21) Appl. No.: 18/258,723

(22) PCT Filed: Dec. 17, 2021

(86) PCT No.: PCT/IB2021/061901
§ 371 (c)(1),
(2) Date: Jun. 21, 2023

(87) PCT Pub. No.: WO2022/137049
PCT Pub. Date: Jun. 30, 2022

(65) Prior Publication Data
US 2024/0042741 A1     Feb. 8, 2024

(30) Foreign Application Priority Data
Dec. 22, 2020     (EP) ..................................... 20216755

(51) Int. Cl.
B32B 21/06        (2006.01)
B32B 3/26         (2006.01)
(Continued)

(52) U.S. Cl.
CPC .............. B32B 21/06 (2013.01); B32B 3/263 (2013.01); B32B 27/42 (2013.01); B32B 37/06 (2013.01);
(Continued)

(58) Field of Classification Search
None
See application file for complete search history.

(56) References Cited

U.S. PATENT DOCUMENTS 2,336,370 A      12/1943  Ripper
5,085,940 A  *   2/1992   Dion ..................... B44C 5/0469
                                                    428/904.4
(Continued)

FOREIGN PATENT DOCUMENTS

CN        108528125 A  *  9/2018   ............. B32B 37/10
EP         2879885 A1     6/2015
(Continued)

OTHER PUBLICATIONS

Shen, J., Preparation Method of High Impact Resistance and High Pressure Decorative Laminated Board, Sep. 14, 2018, machine translation of CN 108528125 (Year: 2018).*
(Continued)

*Primary Examiner* — Chinessa T. Golden
(74) *Attorney, Agent, or Firm* — Workman Nydegger

(57) ABSTRACT

A use of dicyandiamide is provided as a modifier in a melamine-formaldehyde resin for use in a floor panel including a substrate and a top layer. The top layer defines an upper surface of the floor panel. The floor panel is provided with embossments extending from the upper surface, such that the thickness of the floor panel varies along a cross-section of the floor panel. The top layer has a modified melamine-formaldehyde resin including formaldehyde and melamine in an F/M molar ratio within the range of from 1.60 to 1.80,
(Continued)

and at least one modifier, thereby providing a floor panel having improved transparency at the embossments.

11 Claims, 2 Drawing Sheets

(51) Int. Cl.

| | |
|---|---|
| *B32B 27/42* | (2006.01) |
| *B32B 37/06* | (2006.01) |
| *B32B 37/10* | (2006.01) |
| *B32B 38/06* | (2006.01) |
| *E04F 15/10* | (2006.01) |

(52) U.S. Cl.

CPC .............. *B32B 37/10* (2013.01); *B32B 38/06* (2013.01); *E04F 15/107* (2013.01); *B32B 2260/028* (2013.01); *B32B 2260/046* (2013.01); *B32B 2305/07* (2013.01); *B32B 2419/04* (2013.01)

(56) References Cited

U.S. PATENT DOCUMENTS

| | | | |
|---|---|---|---|
| 5,346,937 | A | 9/1994 | Kuchler et al. |
| 6,001,925 | A | 12/1999 | Gapud et al. |
| 2016/0200136 | A1 | 7/2016 | Clement et al. |

FOREIGN PATENT DOCUMENTS

| | | | |
|---|---|---|---|
| WO | 9620230 | A1 | 7/1996 |
| WO | 2006066776 | A2 | 6/2006 |
| WO | 2017072657 | A1 | 5/2017 |

OTHER PUBLICATIONS

Kohlmayr et al, "Modification of Melamine-Formaldehyde Resins by Substances from Renewable Resources", Journal of Applied Polymer Science, vol. 124, Dec. 2, 2011, pp. 4416-4423.

International Search Report from corresponding PCT Application No. PCT/IB2021/061901, Apr. 21, 2022.

Extended European Search Report from corresponding EP Application No. 20216755.7, Jun. 17, 2021.

Hosking, "Direct Pressure Laminate vs. High Pressure Laminate", as early as Jan. 1, 2013, 4 pages.

\* cited by examiner

MODIFIED MELAMINE-FORMALDEHYDE RESIN, A PAPER IMPREGNATED WITH A MODIFIED MELAMINE-FORMALDEHYDE RESIN, A METHOD FOR MANUFACTURING A FLOOR PANEL, AND USE OF DICYANDIAMIDE AS A MODIFIER IN A MELAMINE-FORMALDEHYDE RESIN

BACKGROUND

The present invention relates to a modified melamine-formaldehyde resin, which can for example be used in the manufacturing of a floor panel. This invention also relates to a paper impregnated with a modified melamine-formaldehyde resin, and a method for manufacturing a floor panel.

More particularly, the invention is based on the finding made by the inventors that using dicyandiamide as a modifier in a melamine-formaldehyde resin provides benefits, especially in a direct-pressure laminate (DPL) process and to floor panels manufactured by such a process.

DPL floor panels are well-known as such, for example, from EP 2879885. Herein, this may relate to, for example, floor panels with a substrate which substantially consists of a medium-density fibreboard (MDF) or a high-density fibreboard (HDF board) with a top layer directly pressed thereon. Typically, the top layer comprises a decorative layer in the form of a printed paper sheet. The print, also called the décor, may form a representation of a wood or stone pattern or any other pattern, such as a fancy pattern. The printed paper sheet may be soaked in a melamine-formaldehyde resin, which is cured when the substrate and the top layer are pressed together such that the top layer hardens and adheres to the substrate.

It is further known to provide the upper surface of such a floor panel with embossments, by means of which, for example, wood pores or deeper situated joints in a tile decor may be imitated. As described in WO 2006/066776 and WO 2017/072657, the embossments may be formed when pressing the substrate and the top layer together.

In some circumstances, it is desired that the embossments are rather deep, possibly so deep that the embossments extend down into the substrate. When deep embossments are provided on a floor panel known in the art, pressing defects arise. These may include, for example, cracks occurring in the decorative layer, the decorative layer ripping or splitting and/or the decorative layer not stretching sufficiently to cover the whole floor panel.

Document WO 2006/066776 relates to a DPL floor panel comprising deep embossments which constitute an imitation of so-called scraped wood or which realize a plank effect. The press plate which is used in the DPL process is designed such that most of the pressing defects which occur in the top layer are situated on a portion of the floor panel which will be removed. Thus, the document presents a way to deal with pressing defects but presents no solution to how they can be avoided.

Document WO 2017/072657 relates to a DPL floor panel comprising deep embossments which, for example, realize a plank effect or imitate a joint between tiles. The deep embossments (recesses) are created in the substrate, for example by sawing, before the substrate and top layer are stacked and pressed together. Consequently, the method for manufacturing such a floor panel requires additional equipment and a further process step compared to a conventional DPL process.

U.S. Pat. No. 6,001,925 describes a modified melamine-formaldehyde resin prepared by reacting melamine with formaldehyde at a F/M molar ratio in the range of about 1.55 to 2.5 under alkaline conditions, wherein the resin is prepared in the presence of about 1-10 wt % dicyandiamide and about 1-10 wt % sorbitol based on the total weight of resin solids.

U.S. Pat. No. 2,336,370 describes the production of dicyandiamide resins by modification thereof with melamine.

In WO 96/20230 modified melamine-formaldehyde resins are described which are made from a condensate of formaldehyde, melamine and a modifying agent, containing a combination of a) 5 to 25% by weight, based on melamine, of dicyandiamide and b) 8 to 30% by weight, based on melamine, of water-soluble polyalcohol with at least two hydroxyalkyl groups, the molar ratio of formaldehyde to melamine being between 1.2 to 2.5.

U.S. Pat. No. 5,346,937 relates to modifying agents for melamine-formaldehyde resins and highly reactive thermosetting resins which are prepared with this agent and consist of 1 mol of melamine, 1.5 to 3.5 mol of formaldehyde, 0.5 to 5% by weight of a polyhydric alcohol, based on the melamine plus formaldehyde, and 0.5 to 10% by weight of the modifying agent, based on the liquid resin.

The limited stretchability and flexibility of said known resins are a limiting factor during pressing and curing in a direct-pressure laminate process. For example, should such resins be used to impregnate papers, and said papers are used in a DPL process to form panels each comprising a said paper, a significant number of panels will have pressing defects.

SUMMARY

The present invention primarily aims at offering an alternative floor panel and/or a method for manufacturing said floor panel, wherein a solution is offered to one or more of the problems with the floor panels and methods of the art.

To this aim, the invention relates to a modified melamine-formaldehyde resin, a paper impregnated with a modified melamine-formaldehyde resin, a method for manufacturing a floor panel and a use of dicyandiamide as a modifier in a melamine-formaldehyde resin as defined in the appended independent claims, wherein preferred embodiments are defined in the dependent claims.

The invention relates to a modified melamine-formaldehyde resin comprising formaldehyde and melamine, wherein the resin comprises dicyandiamide, wherein said dicyandiamide is preferably present in an amount suitable for increasing flexibility and stretchability of said melamine-formaldehyde resin during pressing and curing in a direct-pressure laminate process. Dicyandiamide is thus used as a modifier in a melamine-formaldehyde resin, preferably for increasing flexibility and stretchability of the melamine-formaldehyde resin during pressing and curing in a direct-pressure laminate process.

As used herein, the term "flexibility and stretchability" refers to the ability of the uncured or semi-cured resin, for example provided on and/or impregnated in a paper in a decorative layer, to conform to an embossed surface in the final curing step. The term "flexibility and stretchability" is hence indicative of the resin's ability to become deep drawn into the embossments of the surface without showing pressing defects. During pressing and curing in a direct-pressure laminate process, in particular when using a press plate comprising embossing means, the effective area of the upper surface of the floor panel increases, at least due to the embossments formed in the upper surface. Thus, during the step of pressing and curing, the resin must be able to flex and stretch to cover the larger effective area created. The inventors found that the ability of a resin to do so may be quantified using a dry tensile test performed in accordance to EN ISO 1924-2/3 or TAPPI T 494 on paper saturated with the respective resin and comparing it to other resins impregnated under the same conditions on the same paper type. This is one possible way to quantify if the "flexibility and stretchability" will be sufficient, such that the resin can be used in a DPL process and this without forming a limiting factor. Preferably the tensile test is performed on paper having a residual moisture content of 7 wt %, or about 7 wt %, such that among others the test results can be well compared. In the tensile test, the elongation at break can be recorded as a representative value of the flexibility and stretchability. Said paper can for example be a décor paper, such as a digitally printed décor paper or an analogously printed décor paper, with a grammage of between 40 and 135 g/m$^2$.

By using dicyandiamide as a modifier in a melamine-formaldehyde resin, the resin becomes more flexible and stretchable in the press and can better withstand deep embossing, thereby resulting in fewer pressing defects such as, for example, cracks.

Direct-pressure laminate (DPL) processes preferably use a temperature of at least 150° C. for example between 180° C. and 220° C. or between 150° C. and 200° C., and a duration of the pressing between 12 to 60 seconds. and a pressure of more than 20 bar, e.g. between 35 and 40 bar or between 20 to 80 bar.

Preferably, the modified melamine-formaldehyde resin, in which dicyandiamide is used as modifier, comprises formaldehyde and melamine in an F/M molar ratio within the range of from 1.60 to 1.80, preferably from 1.70 to 1.80, more preferably from 1.73 to 1.75. Within these ranges an optimum ratio between methylene and ether bridge formation, with their respective properties, can be obtained in the cured resin. Methylene bridges are thermodynamically favoured while the ether bridge is kinetically favoured. A good ratio between the two crosslinking bridges leads to an optimal combination of flexibility, wet and dry strength of e.g., an impregnated paper, obtained hardness and required reaction time in the DPL process. The reaction time should not be too quick so as to allow for sufficient elongation before the resin is cured, but also not too slow so as to allow for an economic process. Also with such ranges, no undesirable yellowing of the resin occurs during the DPL process.

Dicyandiamide is preferably present in an amount within the range of from 25 to 45%, more preferably from 30 to 40%, even more preferably from 32% to 38%, and most preferably from 34 to 36%, by weight based on the total weight of melamine and dicyandiamide. An amount of dicyandiamide as presented herein gives the modified melamine-formaldehyde resin optimum properties for being used in a DPL process. It was found that the flexibility and stretchability was sufficient if said amount was above 25%. From a less to a most preferred embodiment, the amount is at least 27%, at least 29%, at least 31, at least 33%, at least 35% and from a less to a most preferred embodiment, the amount is at most 41%, at most 39%, at most 37%. The most optimal is when said amount is between 34% to 36%. When said amount was above 45%, the resin was to brittle such that it was less suitable for a DPL process. If the amount is above 38% the solubility of dicyandiamide is a limiting factor in the manufacturing of the modified melamine-formaldehyde resin.

In a preferred embodiment, the amount of dicyandiamide is within a range of from 25 to 45%, preferably from 30 to 40%, more preferably from 34 to 36%, by weight based on the total weight of melamine and dicyandiamide, and the formaldehyde and melamine are present in a formaldehyde/melamine (F/M) molar ratio within the range of from 1.60 to 1.80, preferably from 1.70 to 1.80, more preferably from 1.73 to 1.75. It was found that the combination of the amount of dicyandiamide as presented herein and the F/M molar ratio as presented herein, gives the modified melamine-formaldehyde resin the most optimum properties for being used in a DPL process. For example, if a paper impregnated with the resin according to this preferred embodiment is used in a DPL process to form a panel comprising said paper, no visible pressing defects or are almost no visible pressing defects, resulting from said paper and/or at the height of the paper, are present. Said paper can for example be a décor paper.

Optionally, the direct-pressure laminate process comprises a step of impregnating a carrier with the melamine-formaldehyde resin prior to lamination with a substrate, to thereby form a floor panel. The carrier forms part of a top layer, preferably it forms a decorative layer of the top layer.

By providing the modified melamine-formaldehyde in the decorative layer of the floor panel, the decorative layer is less prone to pressing defects.

The invention also concerns a paper impregnated with a modified melamine-formaldehyde resin as described above. Preferably said paper is a printed paper, such as a printed décor paper. Such papers can be used in the production of floor panels and can for example form a decorative layer of the floor panel. The printed paper can be a digitally printed paper or an analogously printed paper. The paper can have a grammage between 40 and 135 g/m$^2$, for example between 60 and 90 g/m$^2$.

The invention also relates to a use of dicyandiamide as a modifier in a melamine-formaldehyde resin for use in a floor panel. In a preferred embodiment the floor panel preferably comprises a substrate and a top layer, the top layer defining an upper surface of the floor panel, the floor panel is provided with embossments extending from the upper surface, such that a thickness of the floor panel varies along a cross-section of the floor panel and the top layer comprises a modified melamine-formaldehyde resin comprising formaldehyde and melamine in an F/M molar ratio within the range of from 1.60 to 1.80, preferably from 1.70 to 1.80, more preferably from 1.73 to 1.75, and at least one modifier. By this, a floor panel having improved transparency at the embossments is provided.

If cracks occur at the embossments, as is common in the art, the transparency of the resin is deteriorated, and the floor panel will have a less appealing look. By using dicyandiamide, pressing defects such as cracks at the embossments can be mitigated and preferably avoided.

The invention also concerns a modified melamine-formaldehyde resin comprising: formaldehyde and melamine;
   dicyandiamide in an amount within the range of from 25 to 45%, preferably from 30 to 40%, more preferably from 34 to 36%, by weight based on the total weight of melamine and dicyandiamide; and
   preferably polyol, most preferably glycerol, in an amount within the range from 1 to 5%, preferably from 2 to 4%, more preferably from 3 to 4%, by weight based on the total liquid weight of the resin.

The use of polyol may increase the scratch and/or wear resistance of the fully cured resin, while maintaining the desired flexibility and stretchability introduced by the dicyandiamide during storage.

In a preferred embodiment, the modified melamine-formaldehyde resin comprises formaldehyde and melamine in an F/M molar ratio within the range of from 1.60 to 1.80, preferably from 1.70 to 1.80, more preferably from 1.73 to 1.75.

Finally, the invention also relates to a method for manufacturing a floor panel. The floor panel comprises a substrate and a top layer, the top layer defining an upper surface of the floor panel. Further, the floor panel is provided with embossments extending from the upper surface, such that a thickness of the floor panel varies along a cross-section of the floor panel. The method comprises the steps of:

a) Providing the substrate.

b) Providing the top layer, the top layer comprising a modified melamine-formaldehyde resin comprising formaldehyde and melamine in an F/M molar ratio preferably within the range of from 1.60 to 1.80, preferably from 1.70 to 1.80, more preferably from 1.73 to 1.75, and at least one modifier. The at least one modifier is dicyandiamide.

c) Composing a stack which comprises the substrate and the top layer.

d) Pressing the stack by means of a press plate that comprises embossing means and heating means. During pressing, the embossing means provide the floor panel with the embossments and the heating means causes the modified melamine-formaldehyde resin to harden and the top layer to adhere to the substrate.

By providing a top layer that comprises a modified melamine-formaldehyde resin comprising dicyandiamide as a modifier, the stack comprising the top layer can be embossed and laminated without the top layer showing too many pressing defects, such as cracks at the embossments or that the top layer is not able to stretch sufficiently to fully cover the substrate. Thus, there will be less waste in the manufacturing.

Preferably, dicyandiamide is present in the modified melamine-formaldehyde resin in an amount within the range of from 25 to 45%, preferably from 30 to 40%, more preferably from 34 to 36%, by weight based on the total weight of melamine and dicyandiamide. From a less to a most preferred embodiment, the said amount is at least 27%, at least 29%, at least 31, at least 33%, at least 35% and from a less to a most preferred embodiment, the said amount is at most 41%, at most 39%, at most 37%.

An amount of dicyandiamide as presented herein gives the modified melamine-formaldehyde resin optimum properties for being used in the above method for manufacturing a floor panel.

Optionally, the modified melamine-formaldehyde resin further comprises polyol in an amount within the range of from 1 to 5%, preferably from 2 to 4%, most preferably from 3 to 4%, by weight based on the total liquid weight of the resin.

The polyol may be one single polyol such as glycerol, monoethylene glycol (MEG), diethylene glycol (DEG) or polyethyleneglycol (PEG), such as for example polyethyleneglycol 400. Furthermore, the polyol may be a mixture of different polyols, such as two or more polyols.

Optionally, the polyol is glycerol.

Optionally, the substrate comprises medium-density fibreboard (MDF) or high-density fibreboard (HDF).

By providing a substrate comprising MDF or HDF, the embossments, more particularly the deep embossments which extend into the substrate, will be dimensionally stable.

Optionally, the top layer comprises a decorative layer. The decorative layer comprises a printed carrier, more particularly a printed paper.

Optionally, the decorative layer is impregnated with the modified melamine-formaldehyde resin.

By impregnating the decorative layer with the modified melamine-formaldehyde resin, the decorative layer shows better flexibility and stretchability. Thus, the decorative layer is flexible and stretchable enough to withstand the pressing without undue cracking or moving relative to the substrate.

Preferably, in step d) the press plate exerts a pressure of between 20 to 80 bar to the stack, a temperature during pressing is between 150 and 200° C., and a duration of the pressing is between 12 to 60 seconds. These are pressing conditions common to a DPL process.

The invention also relates to a floor panel comprising a substrate and a top layer, the top layer defining an upper surface of the floor panel. Further, the floor panel is provided with embossments extending from the upper surface, such that a thickness of the floor panel varies along a cross-section of the floor panel. The top layer comprises a modified melamine-formaldehyde resin comprising formaldehyde and melamine in an F/M molar ratio within the range of from 1.60 to 1.80, preferably from 1.70 to 1.80, more preferably from 1.73 to 1.75, and at least one modifier, wherein the at least one modifier is dicyandiamide.

Preferably, dicyandiamide is present in an amount within the range of from 25 to 45%, preferably from 30 to 40%, more preferably 34 to 36%, by weight based on the total weight of melamine and dicyandiamide.

Optionally, the modified melamine-formaldehyde resin further comprises polyol in an amount within the range of from 1 to 5%, preferably from 2 to 4%, most preferably from 3 to 4%, by weight based on the total liquid weight of the resin.

Optionally, the polyol is glycerol.

Optionally, the substrate comprises medium-density fibreboard or high-density fibreboard.

By using MDF or HDF in the substrate, the floor panel will, for example, show good stiffness and sound-absorbing properties.

Optionally, the top layer comprises a decorative layer. The decorative layer comprises a printed carrier, more particularly a printed paper.

Optionally, the decorative layer comprises the modified melamine-formaldehyde resin.

To protect the decorative layer, the top layer may further comprise an overlay. The overlay may comprise a carrier, more particularly a carrier mostly consisting of paper.

To improve the durability and the wear resistance of the floor panel, the top layer may further comprise a protective resin layer.

Optionally, the variation of thickness of the floor panel is at least a variation of a thickness of the substrate.

By having embossments that extend into the substrate, such that the thickness of the substrate varies, a floor panel with an improved natural look and feel is achieved.

To, for example, realize a plank effect or to imitate joints between tiles, at least some of the embossments may be in the form of a bevel or other chamfer provided on one or more edges of the floor panel.

To impart an improved, more natural, look to the floor panel, at least some of the embossments may be in the form of structure-imitating embossments provided in the upper surface of the floor panel. Preferably, the structure-imitating embossments may imitate a wood structure.

Optionally, the floor panel is a direct-pressure laminate floor panel.

BRIEF DESCRIPTION OF THE DRAWINGS

With the intention of better showing the characteristics of the invention, hereinafter, as an example without any limitative characters, some preferred embodiments are described, with reference to the accompanying drawings, wherein.

DETAILED DESCRIPTION OF VARIOUS EMBODIMENTS

Figures 1, 2, 3:
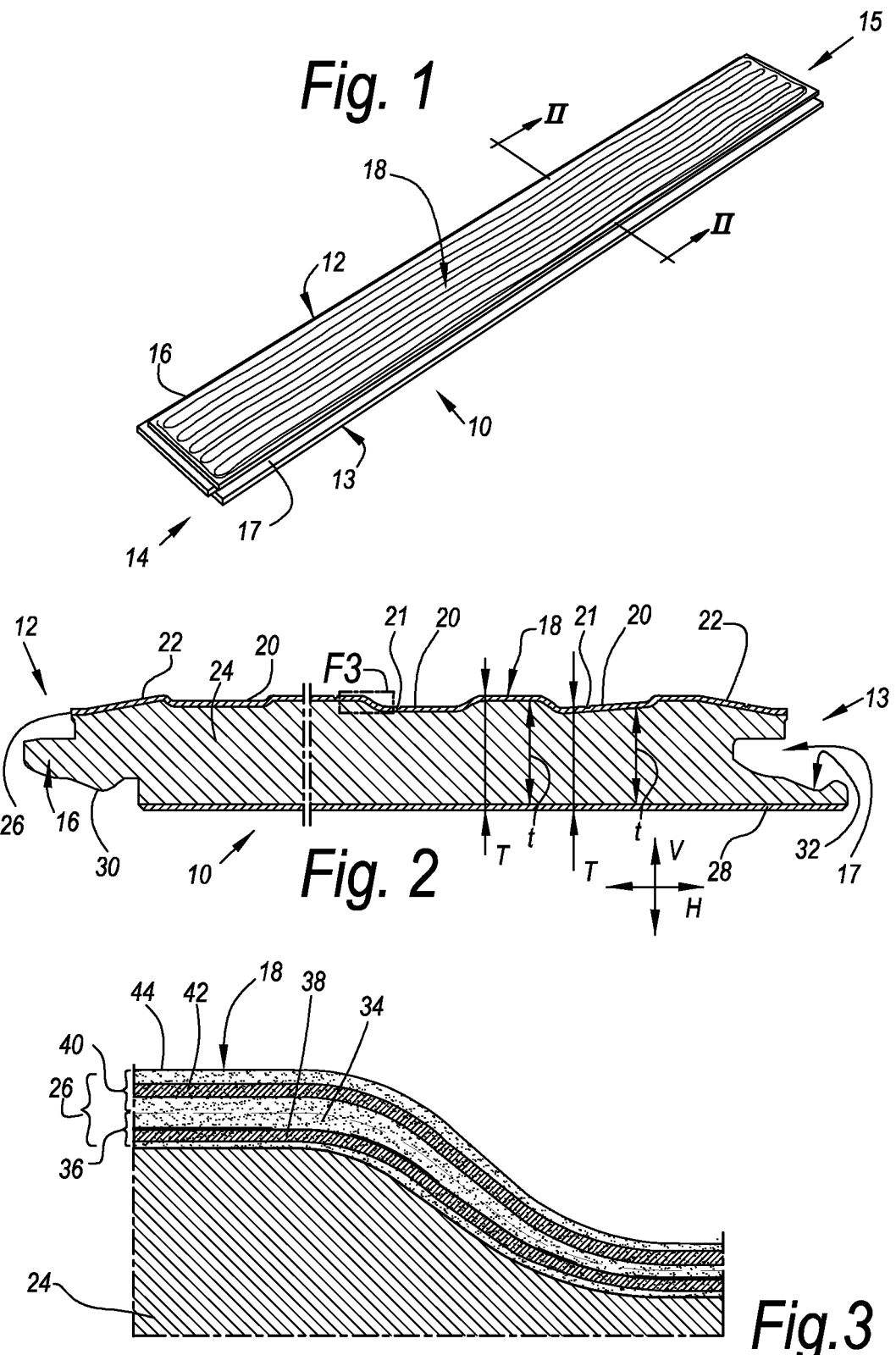
FIG. 1 represents a floor panel made in accordance with the invention.
FIG. 2 represents a cross-section along line II-II in FIG. 1.
FIG. 3 represents in an enlarged manner that which is indicated by F3 in FIG. 2.

In the drawings, reference number 10 generally denotes a floor panel made in accordance with the present invention.

The floor panel 10 is generally rectangular and has a first pair of opposite sides 12, 13 and a second pair of opposite sides 14, 15. In FIG. 1, the first pair of opposite sides 12, 13 is longer than the second pair 14, 15, though it is to be understood that the principles of the present invention are applicable to panels and tiles of any shape, including panels and tiles having sides of the same length. Such panels and tiles include square or polygonal shaped panels and tiles.

In order that a plurality of floor panels 10 may be laid to form a floating floor, each floor panel 10 may be provided, at least at one pair of opposite sides 12, 13, with integrated coupling parts 16, 17 which allow effecting a mechanical coupling between adjacent such floor panels 10. An example of such coupling parts 16, 17 will be described in greater detail with respect to FIG. 2.

The floor panel 10 further comprises an upper surface 18, which constitutes the surface of the floor panel 10 which is visible when the floor panel is installed on an underlying surface or subfloor.

As may be gleaned from FIG. 2, the floor panel 10 is provided with embossments 20, 21, 22 extending from the upper surface 18, such that a thickness T of the floor panel 10 varies along a cross-section of the floor panel 10. The embossments 20, 21, 22 are provided to impart a natural look and feel to the floor panel 10. To that aim, properties such as the depth, the length, the width, and the orientation of each respective embossment 20, 21, 22 of the floor panel 10 may vary.

To realize a plank effect or to imitate joints between tiles, at least some of the embossments 20, 21, 22 may be in the form of a bevel 22 or other chamfer provided on one or more edges of the floor panel 10.

In a variant, at least some of the embossments 20, 21, 22 are in the form of structure-imitating embossments 20, 21 provided in the upper surface 18 of the floor panel 10. Purely by way of example, the structure-imitating embossments 20, 21 may imitate a wood structure, such as wood pores.

As may further be gleaned from FIG. 2, the floor panel 10 of the present invention comprises a plurality of layers, including at least a substrate 24 and a top layer 26. It is conceivable that the floor panel 10 also comprises additional layers, such as a backing layer 28, sound-dampening layers, and/or layers with another purpose.

As discussed above, the depth of the embossments 20, 21, 22 may vary. In one exemplary embodiment, the embossments 20, 22, or at least some of them, may extend into the substrate 24, such that the variation of the thickness T of the floor panel 10 is at least a variation of a thickness t of the substrate 24. In another exemplary embodiment, the embossments 21, or at least some of them, extend only into the top layer 26. Purely by way of example, the embossments may be at least 200 μm deep.

In the embodiment in FIG. 2, the substrate 24 forms the actual core of the floor panel 10. However, it is not excluded that the substrate 24 is composed of several layers or parts. The substrate 24 preferably comprises a product on the basis of wood, more preferably wood fibreboard. According to a preferred embodiment, the substrate 24 comprises medium-density fibreboard (MDF) or high-density fibreboard (HDF).

As is alluded to above, FIG. 2 illustrates a floor panel 10 made in accordance with the invention, which is further provided with coupling parts 16, 17, at least on the first pair of opposite sides 12, 13. The coupling parts 16, 17 allow effecting a locking between two of such floor panels 10 in the vertical direction V and in the horizontal direction H perpendicular to the coupled sides. The illustrated coupling parts 16, 17 are of the type allowing two such floor panels 10 to be coupled together by means of a turning movement. Here, this relates to a particular type of coupling parts in that they also allow coupling of the floor panels 10 by means of a substantially horizontal movement of the floor panels 10 with respect to each other, with the performance of a snap action. This last-mentioned manner of coupling is not represented.

The coupling parts 16, 17 may be in the form of a tongue 16 and a groove 17, which may each be provided with complementary locking elements 30, 32. Preferably, the tongue 16 comprises a protrusion 30 on a lower side. The protrusion 30 is adapted to interact with a locking surface 32 located at the groove 17.

The coupling parts 16, 17 are substantially, and preferably even entirely, manufactured in one piece with and from the material of the floor panel 10. More particularly, the coupling parts 16, 17 are integrally formed in the substrate 24. Nevertheless, it is to be understood that the coupling parts 16, 17 may instead be provided as separate parts that are connected in an integral manner to the floor panel 10.

Of course, other types of coupling parts can be utilized. For example, coupling parts which allow coupling solely by means of a turning movement may be provided. Still another type is so-called "push-lock" coupling parts, which allow coupling of the floor panels by means of a downward and substantially vertical movement.

It is not excluded that the second pair of opposite sides 14, 15 are also provided with integrated mechanical coupling parts. These can be of the same type as the coupling parts on the first pair of opposite sides, though this is not necessarily the case. A particular embodiment is one wherein on a long pair of sides turning coupling parts are applied, whereas on a short pair of sides push-lock coupling parts are applied. In this manner, as two floor panels 10 are being joined by turning along adjacent long sides, the short side of the panel being turned will engage with a push-lock coupling part on a short side of a third panel 10.

An embodiment of a top layer 26, which defines the upper surface 18 of the floor panel 10, is shown in greater detail in FIG. 3. The top layer 26 comprises a modified melamine-formaldehyde resin 34 comprising formaldehyde and melamine in a formaldehyde to melamine (F/M) molar ratio within the range of from 1.60 to 1.80, preferably from 1.70 to 1.80, more preferably from 1.73 to 1.75. Purely by way of example, the F/M molar ratio may be approximately 1.74. The modified melamine-formaldehyde resin 34 further comprises at least one modifier, wherein the at least one modifier is dicyandiamide.

Advantageously, dicyandiamide is present in an amount within the range of from 25 to 45%, preferably from 30 to 40%, more preferably from 34 to 36%, by weight based on the total weight of melamine and dicyandiamide. Purely by way of example, the amount of dicyandiamide may be approximately 35% by weight based on the total weight of melamine and dicyandiamide.

In one embodiment, the modified melamine-formaldehyde resin 34 further comprises polyol in an amount within the range of from 1 to 5%, preferably from 2 to 4%, most preferably from 3 to 4%, by weight based on the total liquid weight of the resin. The polyol may be any of, for example, monoethylene glycol (MEG) or diethylene glycol (DEG). Purely by way of example, the amount of polyol may be approximately 3.40% by weight based on the total liquid weight of the resin.

In a particular embodiment, the polyol may be glycerol.

Preferably, the top layer 26 comprises a decorative layer 36. Herein, the decorative layer 36 relates to a layer providing the floor panel 10 with a visual appearance, such as, for example, a wood or stone pattern. In a variant, the decorative layer 36 comprises a printed carrier 38, more particularly a printed paper. The print on the printed carrier 38 preferably depicts a natural product, for example wood, stone, or ceramics, but it may also depict a fancy pattern. The print may be achieved by means of any of the following printing techniques: offset printing, gravure printing, or a digital printing technique, in which, for example, a digital printer or inkjet printer is applied. However, other printing techniques are not excluded.

Advantageously, the decorative layer 36 comprises the modified melamine-formaldehyde resin 34. In a variant, the printed carrier 38 may be impregnated with the modified melamine-formaldehyde resin 34.

In an exemplary embodiment, the top layer 26 may further comprise an overlay 40. Preferably, the overlay 40 comprises a carrier 42, more particularly a carrier 42 mostly consisting of paper. The overlay 40 may further comprise a resin 44, in particular a melamine-formaldehyde resin 44. The overlay 40 is configured to be a transparent layer which is above the decorative layer 36, advantageously directly above it. Preferably, although not necessarily, the overlay 40 comprises wear-resistant particles, such as corundum.

Although not illustrated in the drawings, the top layer 26 may comprise a protective resin layer. In a variant, the protective resin layer may replace the overlay 40, and may thus be directly above the decorative layer 36. In another variant, the top layer 26 comprises both the overlay 40 and the protective resin layer. The protective resin layer may then be above the overlay 40. However, another position is not excluded. Preferably, the protective resin layer is constituted by a melamine-formaldehyde resin which may comprise wear-resistant particles such as corundum.

In one embodiment of the invention, the floor panel 10 is a direct-pressure laminate (DPL) floor panel 10. Preferably, the DPL floor panel is manufactured by means of a method according to the invention.

Figure 4:
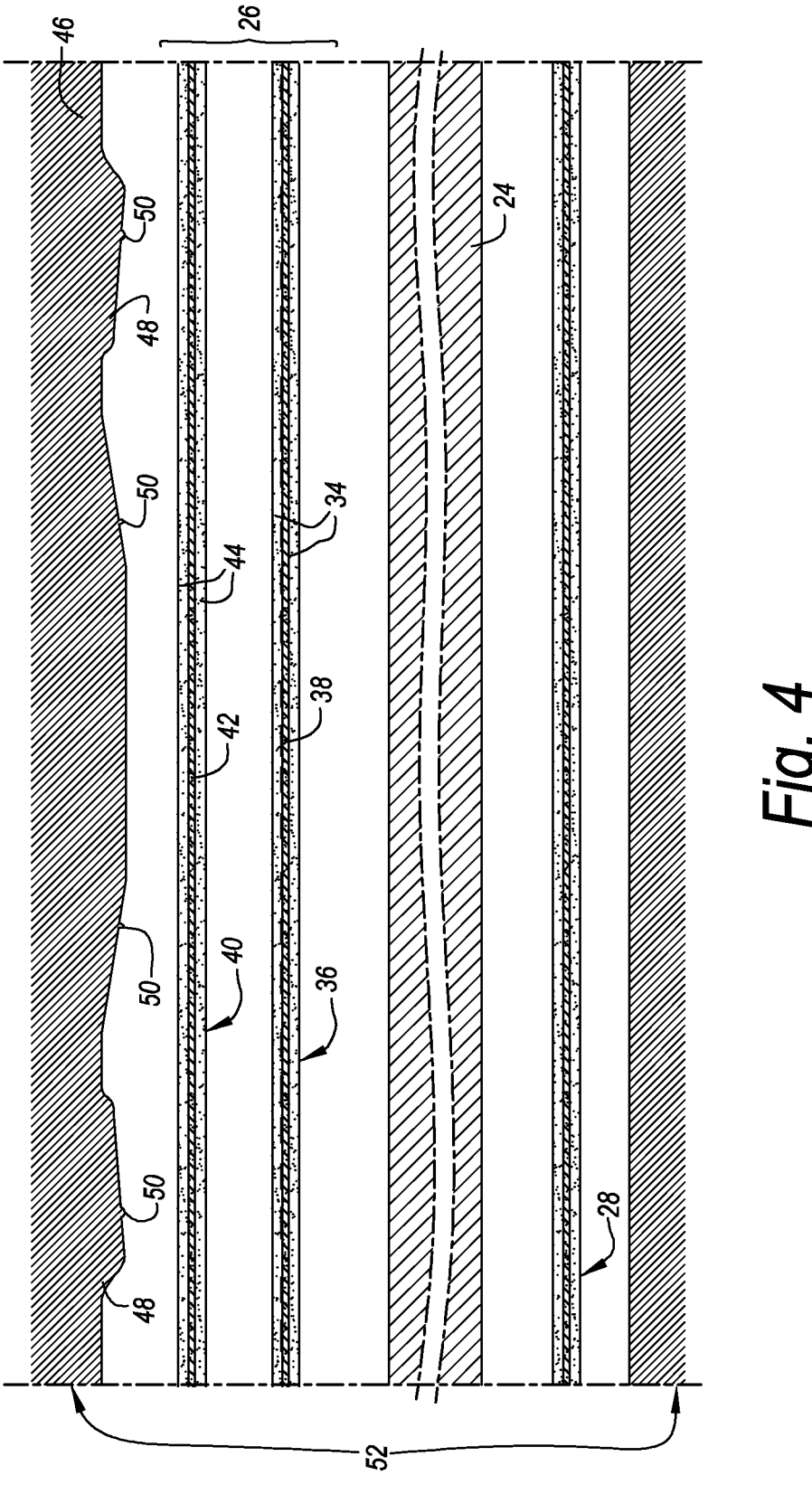
FIG. 4 represents part of a method according to the invention which can be applied for manufacturing the floor panel of the invention.

Further the invention relates to a method for manufacturing a floor panel 10 having the above-described features. A part of such a method is schematically illustrated in FIG. 4.

In one step of the method, referred to as step a), a substrate 24 is provided. Although the production of the substrate 24 or any layers or parts that it may comprise is not illustrated, it will be understood that any suitable techniques may be used to this aim.

The method further comprises step b), in which a top layer 26 is provided. The top layer 26 comprises a modified melamine-formaldehyde resin 34, which comprises formaldehyde and melamine in an F/M molar ratio within the range of from 1.60 to 1.80, preferably from 1.70 to 1.80, more preferably from 1.73 to 1.75, and at least one modifier. The at least one modifier is dicyandiamide.

Advantageously, dicyandiamide is present in the modified melamine-formaldehyde resin 34 in an amount within the range of from 25 to 45%, preferably from 30 to 40%, more preferably from 34 to 36%, by weight based on the total weight of melamine and dicyandiamide.

In one embodiment, the modified melamine-formaldehyde resin 34 further comprises polyol in an amount within the range of from 1 to 5%, preferably from 2 to 4%, most preferably from 3 to 4%, by weight based on the total liquid weight of the resin.

In a particular embodiment, the polyol may be glycerol.

In step c) of the method, a stack comprising the substrate 24 and the top layer 26 is composed. The stack may also comprise additional layers, such as a backing layer 28, sound-dampening layers, and/or layers with another purpose.

In a further step, referred to as step d), the stack composed in step c) is pressed. The pressing is performed by means of a press plate 46 which comprises embossing means 48, 50 and heating means (not illustrated). Preferably, the press plate 46 is part of a heated press 52, in a manner known in the art.

During pressing, the embossing means 48, 50 provide the floor panel 10 with embossments 20, 21, 22 and the heating means causes the modified melamine-formaldehyde resin 34 to harden and the top layer 26 to adhere to the substrate 24. Thus, the floor panel 10 is formed, laminated, and cured in a single step.

In an exemplary embodiment, in step d), the press plate 46 exerts a pressure of between 20 to 80 bar to the stack, a temperature during pressing is between 150 and 200° C., and a duration of the pressing is between 12 and 60 seconds.

Preferably, the embossing means 48, 50 are adapted to provide the floor panel 10 with a desired structure. Thus, the embossing means 48, 50 may be designed to form embossments 20, 22 which extend into the substrate 24 and/or embossments which only extend into the top layer 26. In a particularly advantageous variant, all embossments 20, 21, 22 may be formed in a single pressing operation. Thus, it is clear that the press plate 46 comprises all embossing means 48, 50 necessary to form the desired structure. In another variant, the embossments 20, 21, 22 are formed in more than one step. For example, it is conceivable that some embossments 20, 21, 22 are formed prior to step b) of the method.

To enhance the visual appearance of the floor panel 10, the top layer 26 may comprise a decorative layer 36. In a preferred embodiment, the decorative layer 36 comprises a printed carrier 38, more particularly a printed paper. Preferably, the weight of the printed paper is 60-100 g/m², more preferably 70-90 g/m², most preferably 74-84 g/m².

Optionally, the decorative layer 36 is impregnated with the modified melamine-formaldehyde resin 34.

As yet another option, the top layer 26 may further comprise an overlay 40. Preferably, the overlay 40 comprises a carrier 42, more particularly a carrier 42 mostly consisting of paper, in a manner known in the art. The overlay 40 may further comprise a resin 44, in particular a melamine-formaldehyde resin 44.

Although not illustrated in FIG. 4, the top layer 26 may comprise additional layers, such as for example, a protective resin layer. Preferably, the additional layers, if any, comprises resin, more preferably melamine-formaldehyde resin.

In a variant, all resins in the top layer 26 are fully or at least partly cured in step d).

The invention also relates to a use of dicyandiamide as a modifier in a melamine-formaldehyde resin, for increasing flexibility and stretchability of the melamine-formaldehyde resin during pressing and curing in a direct-pressure laminate process.

Preferably, the modified melamine-formaldehyde resin 34, in which dicyandiamide is used as modifier, comprises formaldehyde and melamine in an F/M molar ratio within the range of from 1.60 to 1.80, preferably from 1.70 to 1.80, more preferably from 1.73 to 1.75.

In one embodiment, dicyandiamide may be present in an amount within the range of from 25 to 45%, preferably from 30 to 40%, more preferably from 34 to 36%, by weight based on the total weight of melamine and dicyandiamide.

In the most preferred embodiment the modified melamine-formaldehyde resin 34 comprises formaldehyde and melamine in an F/M molar ratio within the range of from 1.60 to 1.80, preferably from 1.70 to 1.80, more preferably from 1.73 to 1.75 and the dicyandiamide is present in an amount within the range of from 30 to 40%, preferably from 32 to 38% and more preferably from 34 to 36%, Preferably, the direct-pressure laminate process comprises a step of impregnating a carrier 38 with the melamine-formaldehyde resin 34 prior to lamination with a substrate 24, to thereby form a floor panel 10. In a variant, the carrier 38 forms part of a top layer 26, preferably it forms a decorative layer 36 of the top layer 26.

Further the invention also relates to a use of dicyandiamide as a modifier in a melamine-formaldehyde resin 34 for use in a floor panel 10. The floor panel 10 comprises a substrate 24 and a top layer 26, the top layer 26 defining an upper surface 18 of the floor panel 10. The floor panel 10 is provided with embossments 20, 21, 22 extending from the upper surface 18, such that a thickness T of the floor panel 10 varies along a cross-section of the floor panel 10. The top layer 26 comprises a modified melamine-formaldehyde resin 34 comprising formaldehyde and melamine in an F/M molar ratio within the range of from 1.60 to 1.80, preferably from 1.70 to 1.80, more preferably from 1.73 to 1.75, and at least one modifier. By this, a floor panel 10 having improved transparency at the embossments 20, 21, 22 is provided.

Preferably, the floor panel is a floor panel as described above in relation to FIG. 1-3.

The invention also concerns a modified melamine-formaldehyde resin 34 comprising: formaldehyde and melamine;
dicyandiamide in an amount within the range of from 25 to 45%, preferably from 30 to 40%, more preferably from 34 to 36%, by weight based on the total weight of melamine and dicyandiamide; and
preferably polyol, most preferably glycerol, in an amount within the range from 1 to 5%, preferably from 2 to 4%, more preferably from 3 to 4%, by weight based on the total liquid weight of the resin.

Preferably, the modified melamine-formaldehyde resin 34 comprises formaldehyde and melamine in an F/M molar ratio within the range of from 1.60 to 1.80, preferably from 1.70 to 1.80, more preferably from 1.73 to 1.75.

EXAMPLES

Example 1

This is a comparative study of the flexibility of a decorative paper layer that have been immersed in a melamine-formaldehyde resin either with or without presence of dicyandiamide (DCDA).

The flexibility was measured as elongation at break which is the ratio between increased length and initial length of the tested specimen at a controlled temperature. It is related to the ability of a plastic specimen to resist changes of shape without cracking. Elongation at Break is measured in % (% of elongation vs. initial length when break occurs).

Two resins were prepared. In the resin denominated Test resin, dicyandiamide was present. In the resin denominated reference resin, no dicyandiamide was present. The ingredients and the amount of the ingredients of the resins are shown in Table 1 below.

TABLE 1

| | Weight percentage based on liquid weight of resin | |
| --- | --- | --- |
| | Reference resin (no DCDA present) | Test resin (DCDA present) |
| Formaldehyde 44% | 34.712 | 27.775 |
| Water to add | 19.231 | 26.346 |
| Melamine | 36.867 | 29.499 |
| Dicyandiamide 100% | 0.000 | 12.870 |
| NaOH 25% | 0.110 | 0.110 |
| Sugar 100% | 3.980 | 0.000 |
| Glycerol 100% | 5.100 | 3.400 |
| Total | 100.000 | 100.000 |

The resins in Table 1 were prepared according to standard preparation methods using an automatic IFA system to be able to impregnate on a VITS impregnation line. The DCDA present in the test resin was added to the formaldehyde together with the melamine. The dry content for the reference resin recipe was 48% and the dry content for the test resin recipe was 42%. The sugar used in a reference resin was sucrose.

It was observed that the final reactivity of the test resin was much slower than for the reference resin, i.e. the test resin had a turbidity time of 15 minutes whereas the reference resin had a turbidity time of 5 minutes. Also, at impregnation an about two minutes slower turbidity time was observed for the test resin compared to the reference resin.

Four different decor papers (paper 1-4) having a respective paper weights of 70 g/m², 75 g/m² and 110 g/m² were used in the experiment:
Paper 1-70 g beige colored printed base-paper
Paper 2-70 g white colored printed base-paper
Paper 3-75 g unicolored base-paper black
Paper 4-110 g unicolored base-paper white The respective papers were immersed in the respective resins and thereafter dried in an oven until their residual moisture content was about 7 wt %.

13

The oven temperatures used to dry the papers:

Papers immersed in Reference resin—all ovenfields at 130° C.

Papers immersed in Test resin—all ovenfields at 110° C.

Thereafter, samples of the respective decor papers were cut out in pieces of 6 cm×18 cm. The samples were cut out of impregnated paper made in industrial way. The samples were cut out left (L)/middle (M)/right (R) of the respective paper. These samples were then tested on Zwick pull bench for measuring elongation at break using constant elongation of 3 mm/min.

The samples were wrapped in plastic before testing to avoid interference with temperature and air humidity since extreme humidity can influence the results.

The tests were performed at 20.9° C. and 31% relative humidity.

Measurements of elongation at break were performed both on longitudinal as well as transversal directions of the samples.

The results are shown in Table 2 below.

14

It was unexpectedly observed that the resin comprising 8% DCDA based upon total weight of liquid resin was not good for pressing with a press plate comprising embossing means.

Example 3

In order to further evaluate the effect of the DCDA present in different concentrations in a melamine-formaldehyde resin on the flexibility of a decorative paper layer, such as a printed décor paper, that has been impregnated therewith, the following experiment was conducted.

The samples 1, 2 and 3 are prepared with 0 wt. %, 17.50 wt. % and 30.37 wt. % of DCDA, calculated on a total weight of melamine and DCDA, respectively. The compositions of Test samples 1, 2 and 3 are shown in Table 3.

TABLE 2

| SAMPLE | | Elongation at break- Longitudinal direction Reference resin (in mm) | Elongation at break- Transversal direction Reference resin (in mm) | Elongation at break- Longitudinal direction Test resin (in mm) | Elongation at break- Transversal direction Test resin (in mm) | Delta elongation Longitudinal direction (in mm) | Delta elongation Transversal direction (in mm) |
|---|---|---|---|---|---|---|---|
| Paper 1 | L | 0.91 | 0.85 | 1.53 | 2.58 | +0.62 | +1.73 |
| | M | 1.08 | 0.91 | 1.57 | 2.31 | +0.49 | +1.40 |
| | R | 1.11 | 1.07 | 1.48 | 1.94 | +0.37 | +0.87 |
| Paper 2 | L | 1.10 | 1.06 | 1.61 | 3.16 | +0.51 | +2.10 |
| | M | 1.04 | 0.85 | 1.52 | 2.31 | +0.48 | +1.46 |
| | R | 1.06 | 0.97 | 1.50 | 2.21 | +0.44 | +1.24 |
| Paper 3 | L | 1.13 | 0.96 | 1.75 | 3.23 | +0.62 | +2.27 |
| | M | 1.03 | 0.75 | 1.65 | 2.93 | +0.62 | +2.18 |
| | R | 1.01 | 1.02 | 1.68 | 2.90 | +0.67 | +1.88 |
| Paper 4 | L | 1.07 | 1.09 | 1.49 | 2.51 | +0.42 | +1.42 |
| | M | 0.97 | 0.99 | 1.64 | 2.40 | +0.67 | +1.41 |
| | R | 0.99 | 0.77 | 1.56 | 2.30 | +0.57 | +1.53 |

It was unexpectedly observed that the elongation at break was increased for all the papers that had been immersed with a melamine-formaldehyde resin comprising DCDA. A 35%-70% increased longitudinal elongation and an 80-235% increased transversal elongation at rate is observed in the papers that have been immersed in the resin comprising DCDA in comparison with the papers that have been immersed in the resin without DCDA.

Hence, it was concluded that the presence of dicyandiamide in the melamine-formaldehyde resin led to an improved tensile strength/flexibility of the resin. The inventors noted that the absence of sugar also had a beneficial effect of the flexibility and stretchability of the resin, albeit to a much lesser, even marginal, extent than the presence of DCDA in accordance with the invention.

Example 2

In this example a resin comprising a concentration of 8% by weight DCDA and 32.94% by weight melamine based upon total weight of liquid resin (i.e., a lower concentration of DCDA than is used in example 1), was used for immersing a decorative paper layer before examining its possibilities for pressing.

TABLE 3

| Compositions of Test resins 1, 2 and 3. | | | |
|---|---|---|---|
| Test resin | 1 | 2 | 3 |
| Formaldehyde 44% in water | 34.71% | 31.60% | 27.78% |
| Water | 24.91% | 24.20% | 26.35% |
| Melamine | 36.87% | 33.56% | 29.50% |
| DCDA | 0% | 7.12% | 12.87% |
| NaOH 25% in water | 0.11% | 0.11% | 0.11% |
| Glycerol | 3.40% | 3.40% | 3.40% |

The three samples of the test resins 1, 2 and 3 were used to impregnate paper therewith, and the impregnated papers were tested for bending angle at break, elongation at maximum force and elongation at maximum strain. These tests were chosen to evaluate the flexibility and/or elongation tearing resistance of the test resins 1, 2 and 3. The paper is a décor paper of 75 g/m², that was digitally printed.

Test samples 1, 2 and 3 were tested for a bending angle test. The bending angle test was performed by taping a piece of 200×38 mm paper to a surface, followed by bending the piece (on the short side) until it snapped. For the elongation tests, to determine 'Elongation max force' and 'Elongation max strain', a universal testing machine was used and a piece of 200×30 mm paper. Said testing machine has lower holding grips below and upper holding grips above to hold said piece. The upper holding grips are moved upwards as such to elongate the piece of paper.

The results of the tests are shown in Table 4.

TABLE 4

Results of test samples 1, 2 and 3.

| Test sample | Bending angle at break | Max. elongation force | Max. elongation strain |
|---|---|---|---|
| 1 | 115° | 48.9N | 0.23 mm |
| 2 | 120° | 64.7N | 0.43 mm |
| 3 | 165° | 97.8N | >3.60 mm |

Table 4 shows that test sample 3 with 30.37 wt. % of DCDA, calculated on a total weight of melamine and DCDA shows the best results, i.e. the highest flexibility, as determined by tests such as bending angle test, or under applied force and/or strain. Test sample 1 which comprises no DCDA showed the worst breaking and/or tearing resistance, while the test sample 2 comprising only 17.50 wt. % of DCDA showed better resistance than sample 1, but remarkably lower performance than the test sample 3.

Example 4

Paper samples were impregnated with the resin test samples 1, 2 and 3 prepared with 0 wt. %, 17.50 wt. % and 30.37 wt. % of DCDA, calculated on a total weight of melamine and DCDA, respectively. The full composition of test samples 1, 2 and 3 is shown in Table 3.

Paper samples impregnated with the resins of the test samples 1, 2 and 3 were pressed with bevels for 20 s, at a temperature of 195° C. and a pressure of 80 kg/cm². These pressing conditions are pressing conditions that can occur in a DPL process.

The pressed bevels were inspected for any tearing damage that may have occurred during pressing the bevels. Only paper impregnated with test sample 3 passed the test, and showed no visible tearing at bevels, while paper impregnated with test samples 1 and 2 did not show satisfactory results.

Preferred embodiments and variants of the invention are defined in the following numbered items:

1. Use of dicyandiamide as a modifier in a melamine-formaldehyde resin, for increasing flexibility and stretchability of said melamine-formaldehyde resin during pressing and curing in a direct-pressure laminate process.

2. The use of dicyandiamide according to item 1 wherein said modified melamine-formaldehyde resin comprises formaldehyde and melamine in an F/M molar ratio within the range of from 1.60 to 1.80, preferably from 1.70 to 1.80, more preferably from 1.73 to 1.75.

3. The use dicyandiamide according to item 1 or 2, wherein dicyandiamide is present in an amount within the range of from 25 to 45%, preferably 30 to 40%, more preferably 32 to 38%, most preferably 34 to 36%, by weight based on the total weight of melamine and dicyandiamide.

4. The use of dicyandiamide according to any one of items 1 to 3, wherein said direct-pressure laminate process comprises a step of impregnating a carrier with said melamine-formaldehyde resin, said carrier forming part of a top layer, preferably forming a decorative layer of said top layer, prior to lamination with a substrate, to thereby form a floor panel.

5. Use of dicyandiamide as a modifier in a melamine-formaldehyde resin for use in a floor panel comprising a substrate and a top layer, said top layer defining an upper surface of said floor panel, wherein said floor panel is provided with embossments extending from said upper surface, such that a thickness T of the floor panel varies along a cross-section of said floor panel, said top layer comprising a modified melamine-form-aldehyde resin comprising formaldehyde and melamine in an F/M molar ratio within the range of from 1.60 to 1.80, preferably 1.70 to 1.80, more preferably from 1.73 to 1.75, and at least one modifier, thereby providing a floor panel having improved transparency at said embossments.

6. The use of dicyandiamide according to item 5, wherein said floor panel is a floor panel according to any one of items 17 to 30.

7. A modified melamine-formaldehyde resin 34 comprising:
   formaldehyde and melamine;
   dicyandiamide in an amount within the range of from 25 to 45%, preferably from 30 to 40%, more preferably from 34 to 36%, by weight based on the total weight of melamine and dicyandiamide; and
   preferably polyol, most preferably glycerol, in an amount within the range from 1 to 5%, preferably from 2 to 4%, more preferably from 3 to 4%, by weight based on the total liquid weight of the resin.

8. The modified melamine-formaldehyde resin 34 according to item 7, comprising formaldehyde and melamine in an F/M molar ratio within the range of from 1.60 to 1.80, preferably from 1.70 to 1.80, more preferably from 1.73 to 1.75.

9. A method for manufacturing a floor panel 10 comprising a substrate 24 and a top layer 26, said top layer 26 defining an upper surface 18 of said floor panel 10, wherein said floor panel 10 is provided with embossments 20, 21, 22 extending from said upper surface 18, such that a thickness T of the floor panel 10 varies along a cross-section of said floor panel 10, wherein said method comprises the steps of:
   a) providing said substrate 24;
   b) providing said top layer 26, said top layer 26 comprising a modified melamine-formaldehyde resin 34 comprising formaldehyde and melamine in an F/M molar ratio preferably within the range of from 1.60 to 1.80, preferably from 1.70 to 1.80, more preferably from 1.73 to 1.75, and at least one modifier, wherein said at least one modifier is dicyandiamide;
   c) composing a stack which comprises said substrate 24 and said top layer 26;
   d) pressing said stack by means of a press plate 46, said press plate 46 comprising embossing means 48, 50 and heating means, wherein said embossing means 48, 50 during pressing provide said floor panel 10 with said embossments 20, 21, 22, and wherein said heating means during pressing causes said modified melamine-formaldehyde resin 34 to harden and said top layer 26 to adhere to said substrate 24.

10. The method according to item 9, wherein dicyandiamide is present in an amount within the range of from 25 to 45%, preferably from 30 to 40%, more preferably from 34 to 36%, by weight based on the total weight of melamine and dicyandiamide.

11. The method according to item 9 or 10, wherein the modified melamine-formaldehyde resin 34 further comprises polyol in an amount within the range of from 1 to 5%, preferably from 2 to 4%, most preferably from 3 to 4%, by weight based on the total liquid weight of the resin.

12. The method according to item 11, wherein said polyol is glycerol.

13. The method according to any of items 9 to 12, wherein said substrate 24 comprises medium-density fibreboard or high-density fibreboard.

14. The method according to any of items 9 to 13, wherein said top layer 26 comprises a decorative layer 36, said decorative layer 36 comprising a printed carrier 38, more particularly a printed paper.

15. The method according to item 14, wherein the decorative layer 36 is impregnated with said modified melamine-formaldehyde resin 34.

16. The method according to any of items 9 to 15, wherein in step d) said press plate 46 exerts a pressure of between 20 to 80 bar to said stack, a temperature during pressing is between 150 and 200° C., and a duration of the pressing is between 12 to 60 seconds.

17. A floor panel 10 comprising a substrate 24 and a top layer 26, said top layer 26 defining an upper surface 18 of said floor panel 10, wherein said floor panel 10 is provided with embossments 20, 21, 22 extending from said upper surface 18, such that a thickness T of the floor panel 10 varies along a cross-section of said floor panel 10, wherein the top layer 26 comprises a modified melamine-formaldehyde resin 34 comprising formaldehyde and melamine in an F/M molar ratio within the range of from 1.60 to 1.80, preferably from 1.70 to 1.80, more preferably from 1.73 to 1.75, and at least one modifier, wherein said at least one modifier is dicyandiamide.

18. The floor panel 10 according to item 17, wherein dicyandiamide is present in an amount within the range of from 25 to 45%, preferably from 30 to 40%, more preferably from 34 to 36%, by weight based on the total weight of melamine and dicyandiamide.

19. The floor panel 10 according to item 17 or 18, wherein the modified melamine-formaldehyde resin 34 further comprises polyol in an amount within the range of from 1 to 5%, preferably from 2 to 4%, most preferably from 3 to 4%, by weight based on the total liquid weight of the resin.

20. The floor panel 10 according to item 19, wherein said polyol is glycerol.

21. The floor panel 10 according to any of items 17 to 20, wherein said substrate 24 comprises medium-density fibreboard or high-density fibreboard.

22. The floor panel 10 according to any of items 17 to 21, wherein said top layer 26 comprises a decorative layer 36, said decorative layer 36 comprising a printed carrier 38, more particularly a printed paper.

23. The floor panel 10 according to item 22, wherein the decorative layer 36 comprises said modified melamine-formaldehyde resin 34.

24. The floor panel 10 according to item 23, wherein said top layer 26 further comprises an overlay 40, said overlay 40 comprising a carrier 42, more particularly a carrier mostly consisting of paper.

25. The floor panel 10 according to any of items 22 or 23, wherein said top layer 26 further comprises a protective resin layer.

26. The floor panel 10 according to any of items 17 to 25, wherein said variation of thickness T is at least a variation of a thickness t of the substrate 24.

27. The floor panel 10 according to item 26, wherein at least some of said embossments 20, 21, 22 are in the form of a bevel 22 or other chamfer provided on one or more edges of said floor panel 10.

28. The floor panel 10 according to item 26 or 27, wherein at least some of said embossments 20, 21, 22 are in the form of structure-imitating embossments 20, 21 provided in the upper surface 18 of said floor panel 10, said structure-imitating embossments 20, 21 preferably imitating a wood structure.

29. The floor panel 10 according to any of items 17-28, wherein said floor panel 10 is a direct-pressure laminate floor panel 10.

30. A paper (38) impregnated with a modified melamine-formaldehyde resin (34), said modified melamine-formaldehyde resin (34) comprising formaldehyde, melamine and dicyandiamide, wherein preferably the amount of dicyandiamide is within a range of from 25 to 45%, preferably from 30 to 40%, more preferably from 34 to 36%, by weight based on the total weight of melamine and dicyandiamide and/or wherein preferably the formaldehyde/melamine molar ratio is within the range of from 1.60 to 1.80, preferably from 1.70 to 1.80, more preferably from 1.73 to 1.75.

31. The paper according to item 30, wherein the resin (34) comprises polyol, most preferably glycerol, in an amount within the range from 1 to 5%, preferably from 2 to 4%, more preferably from 3 to 4%, by weight based on the total liquid weight of the resin.

32. The paper (38) according to item 30 or 31, wherein said paper (38) is a printed paper.

The invention claimed is:

1. A modified melamine-formaldehyde resin comprising formaldehyde and melamine, wherein the resin comprises dicyandiamide;

wherein a formaldehyde/melamine molar ratio is within a range of from 1.60 to 1.80, wherein an amount of dicyandiamide is within a range of from 30 to 40% by weight based on a total weight of melamine and dicyandiamide.

2. The modified melamine-formaldehyde resin according to claim 1, wherein the resin comprises polyol, in an amount within a range from 1 to 5%, by weight based on a total liquid weight of the resin.

3. A paper impregnated with a modified melamine-formaldehyde resin, wherein the melamine-formaldehyde resin is a melamine-formaldehyde resin according to claim 1.

4. The paper impregnated with a modified melamine-formaldehyde resin according to claim 3, wherein said paper is printed paper.

5. A method for manufacturing a floor panel comprising a substrate and a top layer, said top layer defining an upper surface of said floor panel, wherein said floor panel is provided with embossments extending from said upper surface, such that a thickness of the floor panel varies along a cross-section of said floor panel, wherein said method comprises the steps of:

a) providing said substrate;

b) providing said top layer, said top layer comprising a modified melamine-formaldehyde resin comprising formaldehyde and melamine in a formaldehyde/melamine molar ratio within a range of from 1.60 to 1.80, and at least one modifier, wherein said at least one modifier is dicyandiamide, wherein an amount of dicyandiamide is within a range of from 30 to 40% by weight based on a total weight of melamine and dicyandiamide;

c) composing a stack which comprises said substrate and said top layer;

d) pressing said stack by means of a press plate, said press plate comprising embossing means and heating means, wherein said embossing means during pressing provide said floor panel with said embossments, and wherein said heating means during pressing causes said modified melamine-formaldehyde resin to harden and said top layer to adhere to said substrate.

6. The method according to claim 5, wherein the modified melamine-formaldehyde resin further comprises polyol in an amount within a range of from 1 to 5%, by weight based on a total liquid weight of the resin.

7. The method according to claim 6, wherein said polyol is glycerol.

8. The method according to claim 5, wherein said substrate comprises medium-density fibreboard or high-density fibreboard.

9. The method according to claim 5, wherein said top layer comprises a decorative layer, said decorative layer comprising a printed carrier.

10. The method according to claim 9, wherein the decorative layer is impregnated with said modified melamine-formaldehyde resin.

11. The method according to claim 5, wherein in step d) said press plate exerts a pressure of between 20 to 80 bar to said stack, a temperature during pressing is between 15° and 200° C., and a duration of the pressing is between 12 to 60 seconds.

\* \* \* \* \*